United States Patent
Pryor

(10) Patent No.: US 8,146,875 B2
(45) Date of Patent: Apr. 3, 2012

(54) MOSQUITO COIL HOLDER

(76) Inventor: Dennis Pryor, Cairns (AU)

( * ) Notice: Subject to any disclaimer, the term of this patent is extended or adjusted under 35 U.S.C. 154(b) by 129 days.

(21) Appl. No.: 12/672,759

(22) PCT Filed: Sep. 12, 2008

(86) PCT No.: PCT/AU2008/001366
§ 371 (c)(1),
(2), (4) Date: Feb. 9, 2010

(87) PCT Pub. No.: WO2009/036492
PCT Pub. Date: Mar. 26, 2009

(65) Prior Publication Data
US 2011/0198472 A1    Aug. 18, 2011

(30) Foreign Application Priority Data
Sep. 21, 2007    (AU) ................ 2007216907

(51) Int. Cl.
*A47G 1/10*    (2006.01)
(52) U.S. Cl. ........... 248/316.5; 24/545; 24/546; 24/563; 43/125; 248/316.7
(58) Field of Classification Search ............... 248/316.7, 248/316.5, 229.13, 229.16, 229.23, 229.26; 43/125, 124, 127; 24/545, 546, 555, 557, 24/563
See application file for complete search history.

(56) References Cited

U.S. PATENT DOCUMENTS

| 5,361,463 | A |   | 11/1994 | Revis |   |
|---|---|---|---|---|---|
| 5,414,911 | A | * | 5/1995 | Adams | 24/545 |
| 6,799,756 | B2 | * | 10/2004 | Degen | 269/96 |
| D516,904 | S |   | 3/2006 | Kendrick |   |
| 2002/0124459 | A1 |   | 9/2002 | Davis |   |
| 2003/0116686 | A1 | * | 6/2003 | Noniewicz | 248/231.51 |
| 2003/0182773 | A1 | * | 10/2003 | Ellwood | 24/334 |
| 2005/0086776 | A1 | * | 4/2005 | Bergmark | 24/545 |
| 2007/0175006 | A1 | * | 8/2007 | Chen | 24/545 |

FOREIGN PATENT DOCUMENTS

DE    19714243 A1    10/1998
JP    9140312 A    6/1997

* cited by examiner

Primary Examiner — Ramon Ramirez

(74) *Attorney, Agent, or Firm* — David A. Guerra

(57) ABSTRACT

A mosquito coil holder in the form of a clip. The clip has a first and second contact portions each adapted to contact a mosquito coil and to hold a mosquito coil therebetween. First and second support portions support the respective first and second contact portions relative to each other. A connection portion connects the first and second support portions. The clip includes at least one base portion which acts as a base upon which the clip can stand in use, while holding a mosquito coil.

19 Claims, 10 Drawing Sheets

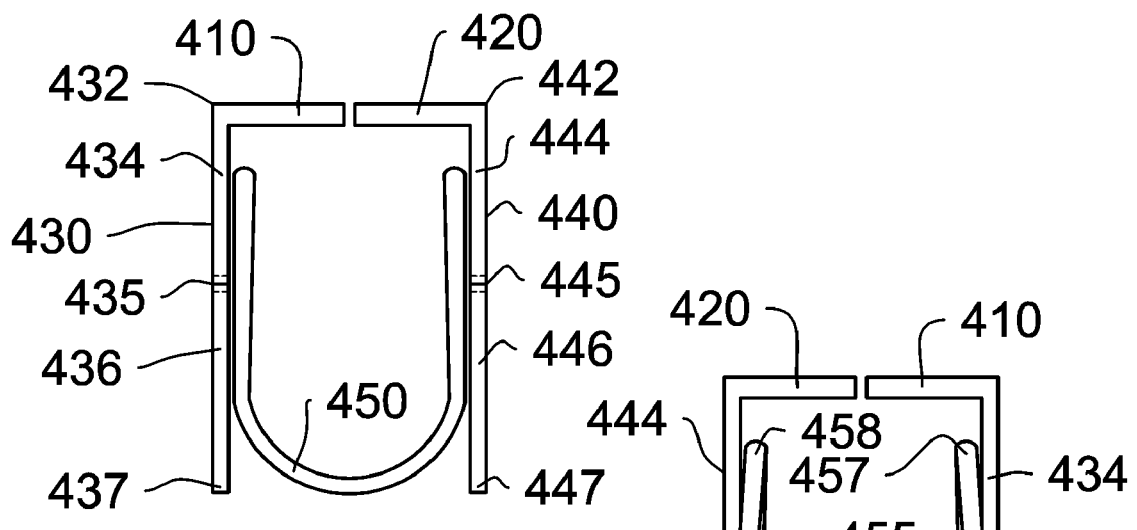
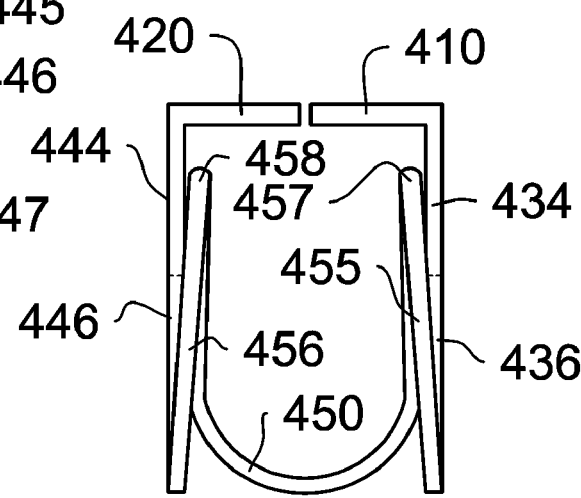
Fig. 18
Fig. 19
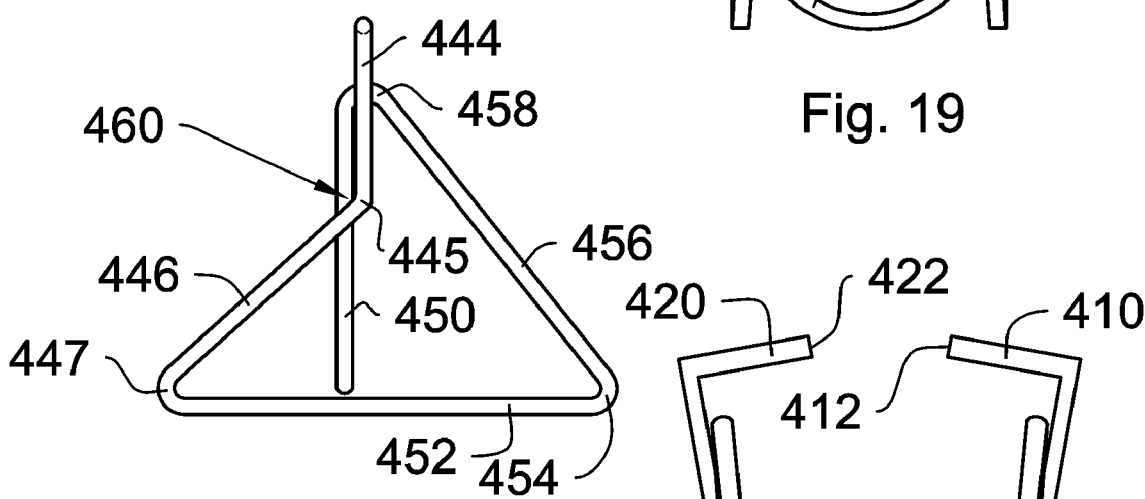
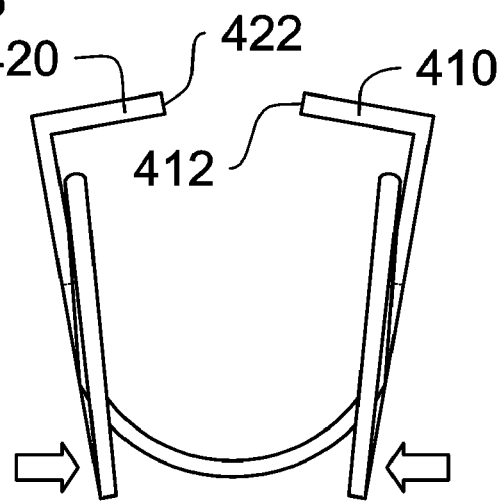
Fig. 20
Fig. 21

MOSQUITO COIL HOLDER

CROSS-REFERENCE TO RELATED APPLICATIONS

This application is an U.S. national phase application under 35 U.S.C. §371 based upon co-pending International Application No. PCT/AU2008/001366 filed on Sep. 12, 2008. Additionally, this U.S. national phase application claims the benefit of priority of co-pending International Application No. PCT/AU2008/001366 filed on Sep. 12, 2008, and Australia Application No. 2007216907 filed on Sep. 12, 2007. The entire disclosures of the prior applications are incorporated herein by reference. The international application was published on Mar. 26, 2009 under Publication No. WO 2009/036492.

FIELD OF THE INVENTION

The present invention relates to a holder for mosquito coils.

BACKGROUND OF THE INVENTION

Burning mosquito coils is a cost effective way of avoiding or reducing the presence of mosquitoes and the incidence of mosquito bites and associate discomfort and health risks.

Several types of mosquito coil holders are available. One type of mosquito coil holder is a thin pressed metal stand which has a projection at an upper part thereof adapted to fit into a slot at the centre of a mosquito coil in order to support the mosquito coil in a substantially horizontal plane, spaced apart from a support surface, such as a floor on which the stand is placed. Such stands are flimsy and because they are adapted to attach to the centre of a mosquito coil cannot effectively be used with parts of mosquito coils which are detached from the central part.

Another type of mosquito coil holder comprises a circular body in the form of a shallow dish and a similarly shaped complementary perforated lid, and in use the mosquito coil is accommodated within the body. This type of mosquito coil holder provides a heat resistant support, typically a heat resistant net or mesh, adapted to support the burning mosquito coil within the holder. A mosquito coil holder of this type is described in U.S. Pat. No. 4,126,958. Such holders are relatively bulky and expensive.

SUMMARY OF THE INVENTION

According to a first aspect of the present invention there is provided a mosquito coil holder which comprises a clip, the clip comprising:

first and second contact portions each adapted to contact a mosquito coil and to hold a mosquito coil therebetween;

first and second support portions which support the respective first and second contact portions relative to each other; and a connection portion which connects the first and second support portions;

and wherein the clip comprises at least one base portion which acts as a base upon which the clip can stand in use, while holding a mosquito coil.

Preferably at least one base portion comprises at least a part of one of the support portions.

Preferably at least one base portion comprises a transitional portion between one of the support portions and the connection portion.

Preferably the clip comprises at least one base portion, and is adapted to hold a mosquito coil in a substantially horizontal plane when standing upon said base part.

Preferably the clip comprises at least one base portion, and is adapted to hold a mosquito coil in a substantially vertical plane when standing upon said base part.

Preferably the clip defines a receiving space between the support portions.

Preferably the receiving space extends substantially the entire length of the clip.

Preferably the receiving space is at least 50 mm in length.

Preferably the receiving space has a length at least equal to the radius of a mosquito coil.

Preferably the clip is elongate in from.

Preferably the contact portions are provided substantially at a first end of the clip and the connection portion is provided substantially at the other, second, end of the clip.

Preferably the connection portion and first and second support portions are formed as a single one piece unit.

Preferably the connection portion and first and second support portions are formed from a single piece of metal.

Preferably the clip is formed from a single piece of metal.

In an embodiment the clip is formed from a piece of metal sheet.

In another embodiment the clip is formed from a single elongate piece of metal wire. The metal wire may be substantially circular in cross section. The metal wire may have a thickness of between 1.5 mm and 5 mm. The clip may be formed by bending the metal wire into shape.

Preferably at least one of the contact portions comprises at least one first contact part, for contacting a mosquito coil and at least one second contact part for contacting a mosquito coil, wherein the or each first contact part is closer to the connection portion than the or each second contact part.

Preferably each of the first and second jaws comprises at least one respective first contact part and at least one respective second contact part.

Preferably the contact portions are formed by pressing from sheet-like portion of material.

Preferably, on at least one of the contact portions, at least one first contact part and at least one second contact part are formed by a single crimping operation.

According to a second aspect of the present invention there is provided a mosquito coil holder which comprises a clip, the clip comprising:

first and second contact portions each adapted to contact the mosquito coil and to hold said mosquito coil therebetween;

first and second support portions which support the respective first and second contact portions relative to each other; and a connection portion which connects the first and second support portions and allows them to move relative to each other;

and wherein a receiving space for receiving at least part of a mosquito coil therein is provided between the support portions and extends between the contact portions and the connection portion, and wherein the receiving space is adapted to accommodate parts of several turnings of a mosquito coil.

Preferably the receiving space extends at least 70% of the length of the clip.

Preferably the receiving space extends at least 80% of the length of the clip.

Preferably the receiving space extends substantially the entire length of the clip.

Preferably the receiving space is at least 60 mm in length.

Preferably the receiving space is between 60 and 90 mm in length.

Preferably the receiving space has a length of between about 95% and about 130% of the radius of a standard commercially available mosquito coil. It is believed that standard commercially available mosquito coils currently are between approximately 105 mm and 145 mm in diameter, so in preferred embodiments the receiving space has a length of between about 50 mm and about 95 mm, but it will be appreciated that different size clips could be produced to act as holders for different sized mosquito coils.

Preferably the contact parts are adapted to grip a centre part of a mosquito coil therebetween and the connection part is adapted to extend between the first and second support portions beyond an outer periphery of the mosquito coil being held.

Preferably the clip comprises at least one base portion which acts as a base upon which the clip can stand in use when holding a mosquito coil.

Preferably at least one base portion comprises at least a part of one of the support portions.

Preferably at least one base portion comprises a transitional portion between one of the support portions and the connection portion.

According to a third aspect of the present invention there is provided, in combination, a mosquito coil and a mosquito coil holder, wherein the mosquito coil holder is in accordance with at least one of the first and second aspects of the present invention.

According to a fourth aspect of the present invention there is provided a method of supporting a mosquito coil during burning thereof, comprising use of a mosquito coil holder in accordance with at least one of the first and second aspects.

According to a fifth aspect of the present invention there is provided a holder suitable for holding an object such as a mosquito coil, the holder being in accordance with at least one of the first and second aspects of the present invention. Such a holder may be adapted for, intended for, or marketed for holding of objects other than mosquito coils without falling outside the scope of this aspect of the invention.

It will be appreciated that features described above in relation to any of the aspects of the invention may also be applicable to one or more of the other aspects.

BRIEF DESCRIPTION OF THE DRAWINGS

Embodiments of the invention will now be described, by way of example only, with reference to the accompanying drawings, in which:

FIGS. 18 to 20 are, respectively, a front view, a rear view and a side view of the embodiment of FIG. 17; and FIG. 21 is a second end view of the embodiment of FIGS. 17 to 20, in use, in a forced-open configuration.

DETAILED DESCRIPTION OF PREFERRED EMBODIMENTS

Figure 1:
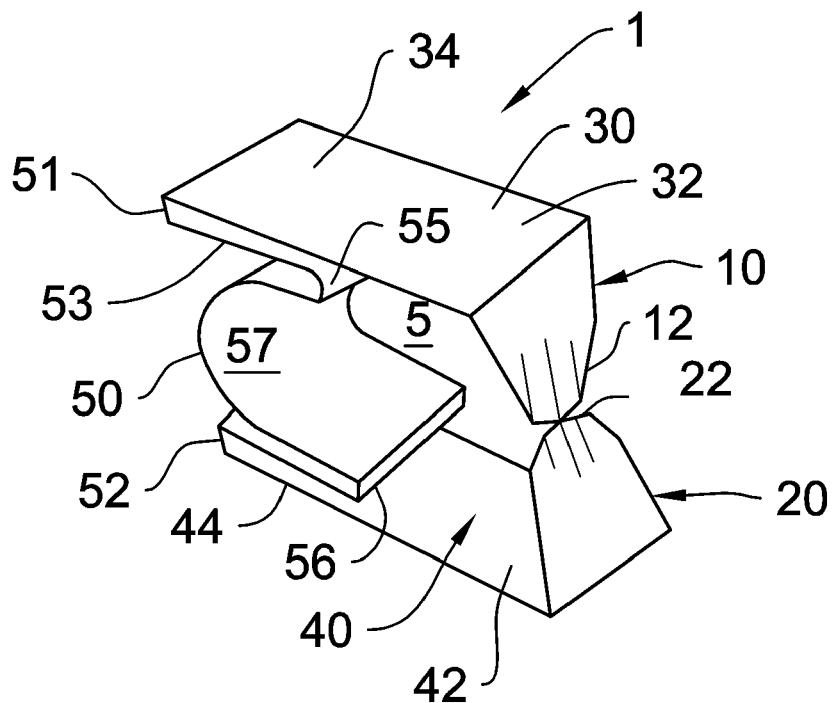
FIG. 1 is a perspective view of an embodiment of a mosquito coil holder in accordance with the present invention.

With reference to FIGS. 1 to 8 a preferred embodiment of a mosquito coil holder in accordance with the present invention is generally designated 1 and comprises a first contact portion which in this embodiment is in the form of a first jaw 10 and a second contact portion which in this embodiment is in the form of a second jaw 20. The first and second jaws 10,20 have respective contact edges 12,22 adapted to grip and retain a mosquito coil 2 therebetween.

The first jaw 10 is supported by a first support portion in the form of a support arm 30. Second jaw 20 is supported by a second support arm 40. The first and second support arms 30,40 are generally mutually parallel and extend away from the respective first and second jaws 10,20 which are formed by bends at first end parts 32,42 of the first and second support arms 30,40. The first and second support arms are connected and spaced apart by a connection portion in the form of a connecting part 50 which connects respective second end parts 34,44 of the first and second support arms 30,40.

The holder 1 is therefore in the form of a clip which provides a receiving space 5 between the support arms 30,40 and between the jaws 10,20 and the connecting part 50 into which a mosquito coil 2 can extend in use, without being contacted by any part of the holder 1 apart from the jaws 10,20.

The connecting part 50 is configured so that the receiving space 5 extends substantially the entire length of the holder 1.

Figure 5:
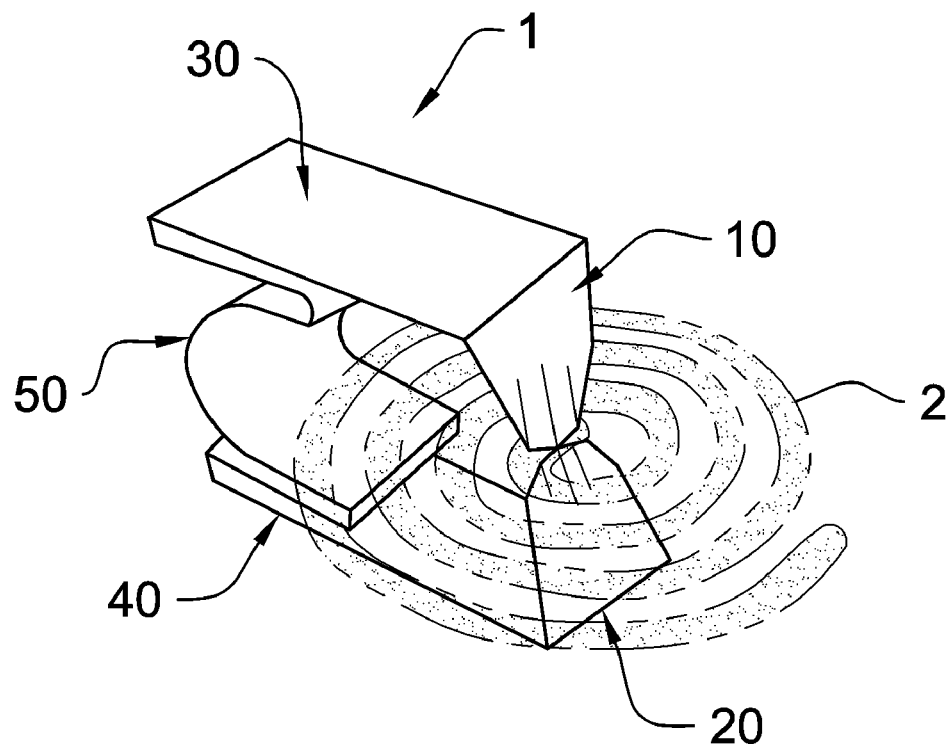
FIG. 5 is a perspective view of the mosquito coil holder of FIGS. 1 to 4 holding an entire mosquito coil in a substantially horizontal orientation.
Figure 6:
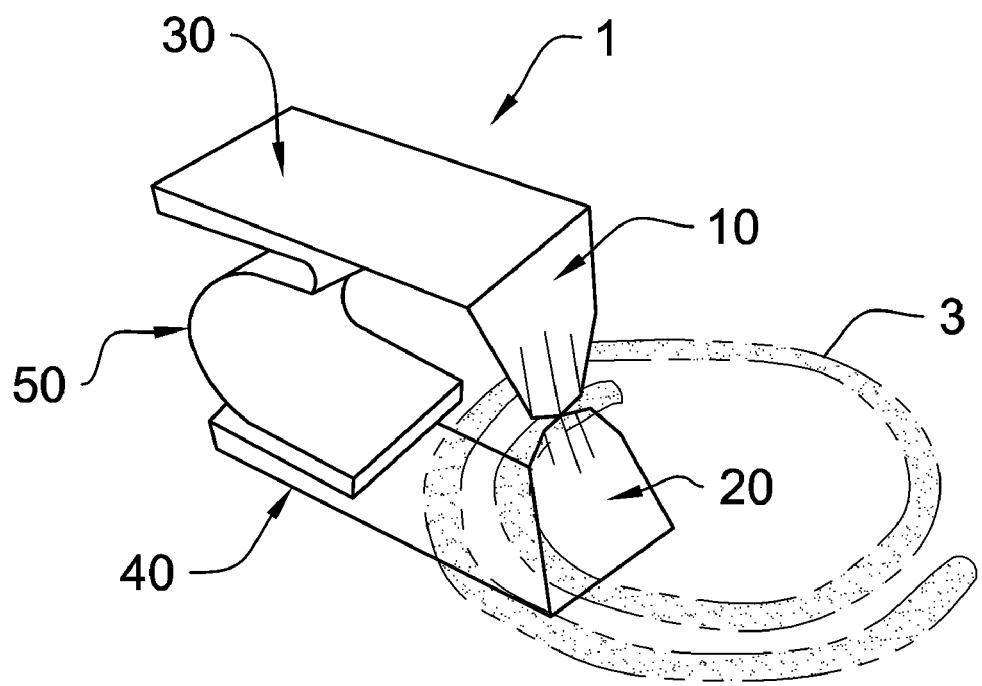
FIG. 6 is a perspective view of the mosquito coil holder of FIGS. 1 to 5 holding part of a mosquito coil in a substantially horizontal orientation.

The holder 1 is shaped so that in use it can be stood upon one of the first and second support arms 30,40, as illustrated in FIGS. 5 and 6 so as the central axis (not shown) of the holder 1 lays substantially horizontal and so that a mosquito coil 2 or part of a mosquito coil 3 can be held in a substantially horizontal orientation. Thus, one or both of the support arms 30,40 is able to act as a base of the mosquito coil holder 1.

Figure 2:
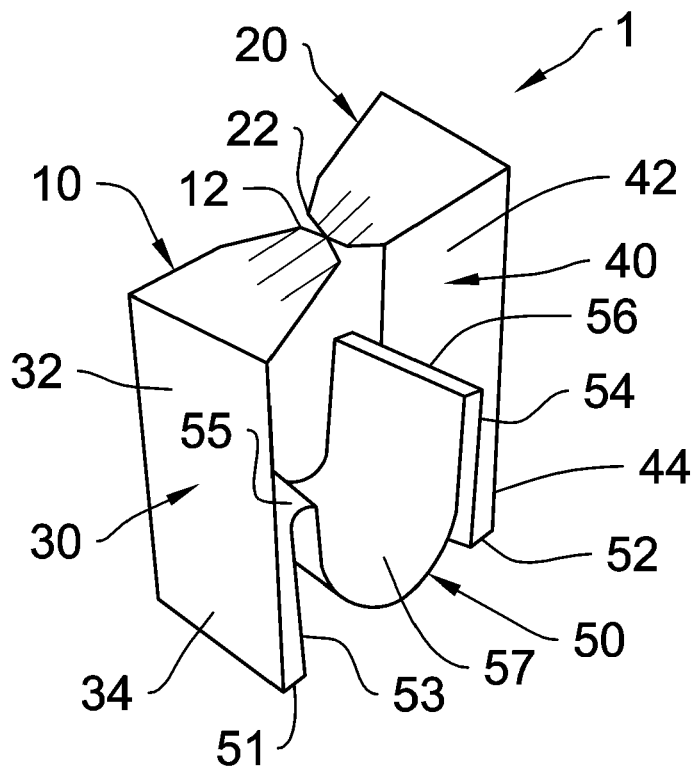
FIG. 2 is a perspective view of the mosquito coil holder of FIG. 1 in an alternative orientation.

With reference in particular to FIGS. 1 and 2, the connecting part 50 will now be described in more detail. The connecting part 50 is attached to the second end 34,44 of the support arms 30,40 at what may be considered to be transitional parts 51,52 between the supports arms 30,40 and the connecting part 50. Depending from the first transitional part 51 a generally planar return part 53 of the connecting part 50, extends adjacent and parallel to the second end or part 34 of the first support arm 30, and extends approximately half the length of the support arm 30 and second return part 54 on the other side of the clip, corresponds, and extends adjacent and parallel to the second end part 44 of the second support arm 40. The return parts 53,54 are connected by a central portion 57 of the connecting part 50 which is formed so that the region 58 thereof which is equidistant from the support arms 30,40 is provided substantially at the opposite end of the clip to the first and second jaws 20,30 thus allowing the receiving space 5 to extend substantially the entire length of the mosquito coil holder 1. In preferred embodiments the receiving space 5 has a length only slightly greater than the radius of a mosquito coil with which the mosquito coil holder is intended to be used. If compact size is of particular importance the receiving space 5 may have a length slightly smaller than a radius of a mosquito coil with which the mosquito coil holder is intended to be used, because the "central" part of a mosquito coil is typically not exactly central. Alternatively, the receiving space 5 may have a length considerably greater than a radius of a mosquito coil with which the mosquito coil holder is intended to be used, in order to provide greater stability, or to provide the option of use with larger mosquito coils. It is believed that standard commercially available mosquito coils currently vary between approximately 105 mm and 145 mm in diameter, so in preferred embodiments the receiving space (and the mosquito coil holder) has a length of between about 50 mm and about 95 mm, but it will be appreciated that different size clips could be produced to act as holders for different sized mosquito coils.

In the illustrated embodiment, the mosquito coil holder 1 is formed from a substantially planar elongate strip of material such as 0.5 mm thick sheet steel, which is pressed, bent or folded into the illustrated configuration. Thus, the transitional parts 51,52 are essentially in the form of 180° turns in the strip of material and the transition between the return parts 53,54 and the central part 57 of the connecting part also take the form of substantially 180° turns 55,56.

Figure 7:
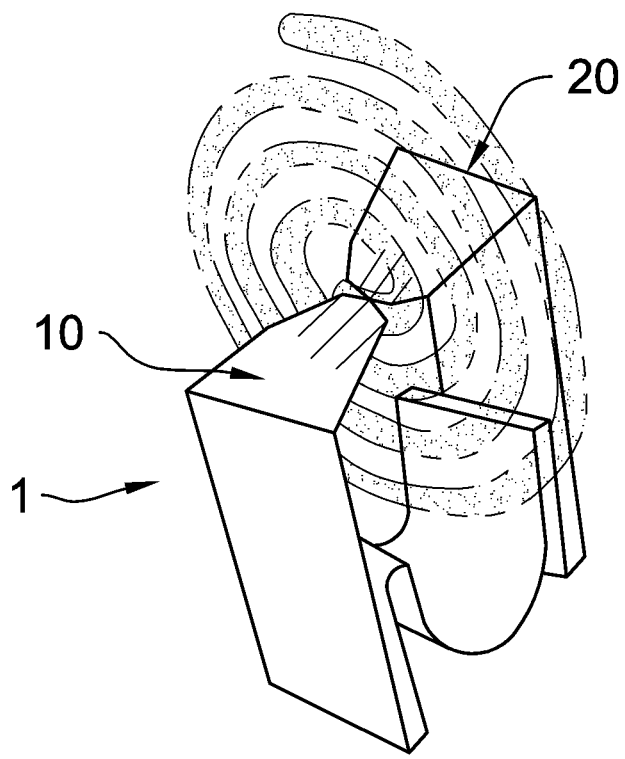
FIG. 7 is a perspective view of a mosquito coil holder of FIGS. 1 to 6 holding a mosquito coil in a substantially vertical orientation.
Figure 8:
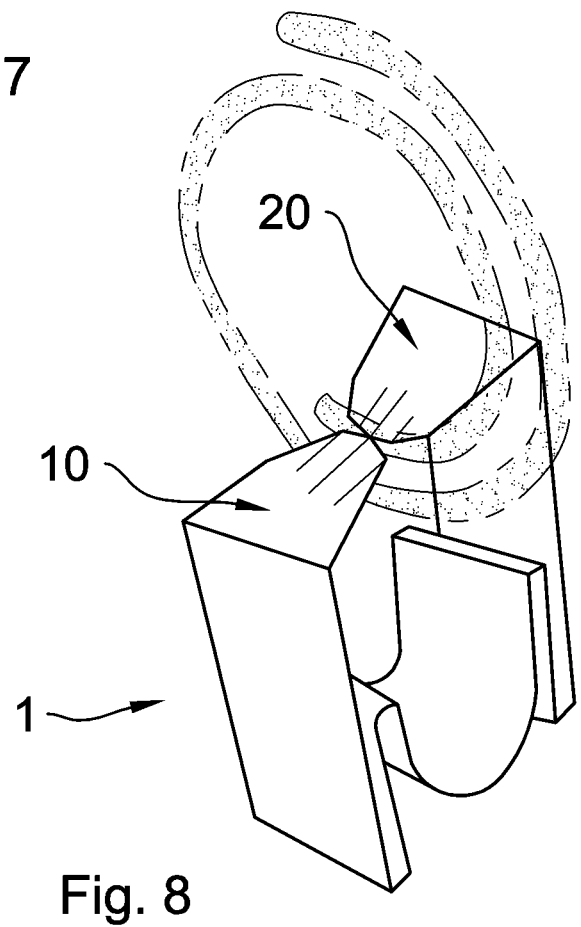
FIG. 8 is a perspective view of the mosquito coil holder of FIGS. 1 to 7 holding a part of a mosquito coil in a substantially vertical orientation.
Figure 9:
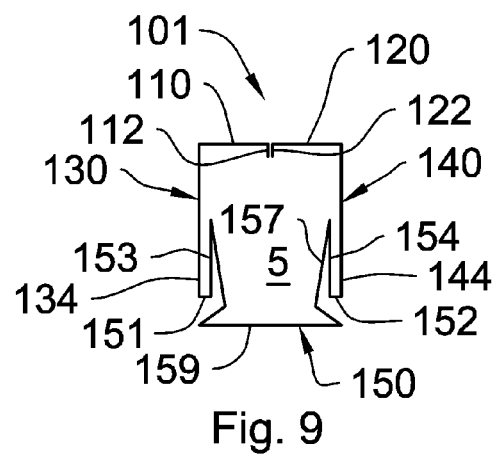
FIG. 9 is a schematic side view of an alternative embodiment of a mosquito coil holder in accordance with the present invention.
Figure 10:
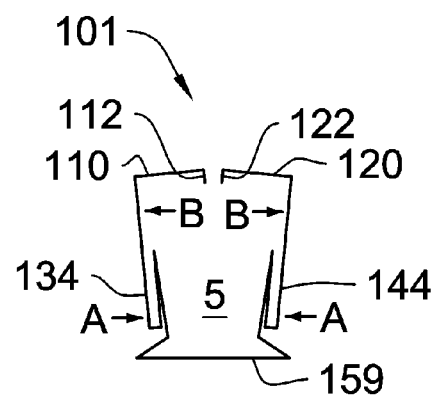
FIG. 10 is a schematic side view of the mosquito coil holder of FIG. 9 illustrating operation of the holder to allow receipt of a mosquito coil.

It will also be appreciated that in the illustrated embodiment the central part 57 of the connecting part is curved to provide a concave shape contributing to the length of the receiving space 5. It will be appreciated that the transitional parts 51,52 of the holder 1 provide parallel spaced-apart generally straight portions of the mosquito coil holder which, as illustrated in FIGS. 2, 7 and 8, may together form a base upon which the mosquito coil holder may be stood. This allows the mosquito coil holder 1 to stand upon a surface with a central axis thereof in a generally vertical orientation, so that the mosquito coil holder 1 can hold a mosquito coil 2 or part of a mosquito coil 3 in a generally vertical orientation, as shown in particular in FIGS. 7 and 8. It will be appreciated that in this embodiment the central part 57 of the connection part does not extend beyond the transitional parts 51,52 (since this would detract from or preclude use of the transitional parts 51,52 as a base for the holder 1.

Figure 3:
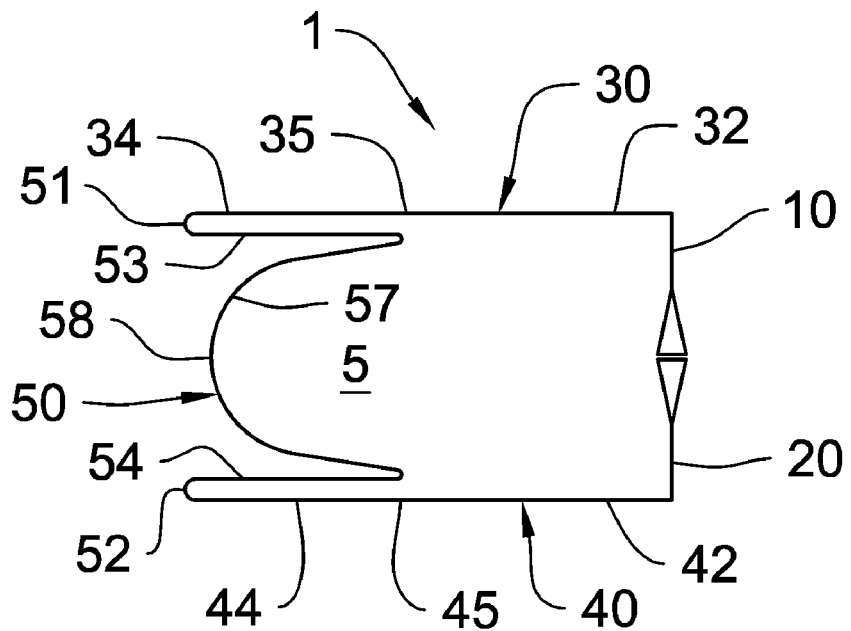
FIG. 3 is a side view of the mosquito coil holder of FIGS. 1 and 2.
Figure 4:
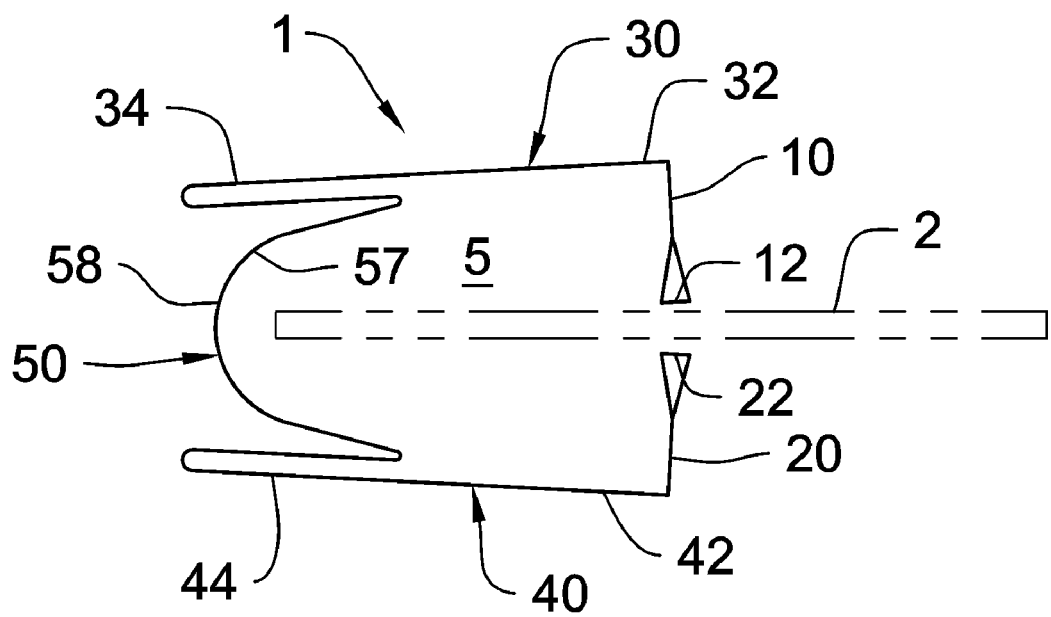
FIG. 4 is a side view of a mosquito coil holder of FIGS. 1 to 3 holding a mosquito coil.

With reference to FIGS. 3 and 4, it will be appreciated that the second end parts 34,44 of the support arms 30,40 may be forced towards each other in order to bring them slightly closer together than when the mosquito coil holder is in its equilibrium configuration (as shown in FIG. 3).

Central regions 35,45 of the support arms 30,40 are held apart by the structure of the connecting part, so that forcing the second end parts 34,44 towards each other forces the first and second jaws 10,20 away from each other, opening a space for insertion of a mosquito coil 2 (or part of a mosquito coil) between the first and second jaws 10,20. The second end parts 34,44 thus provide operating portions which may be acted upon, for example, by pinching between thumb and forefinger, in order to effectively open the jaws 10,20 of the mosquito coil holder 1.

In the circumstances where the entire mosquito coil is to be held by the mosquito coil holder 1, the first and second jaws 10,20 are engaged on a central part of the mosquito coil 2 so that a radius of the mosquito coil 2 extends from the jaws 10,20 towards the other end of the mosquito coil holder 1 and is accommodated in the receiving space 5. Because the receiving space 5 extends substantially the entire length of the mosquito coil holder 1, the mosquito coil holder 1 need have a length only approximately the same as (or slightly greater than) the radius of the mosquito coil 2.

The first and second jaws are configured so that they can grip either the central portion of a mosquito coil 2 or the substantially flat opposed surfaces of any other part of a mosquito coil, allowing parts of mosquito coils which are detached from the mosquito coil central part to be held effectively and without difficulty. This is in contrast to the most commonly used mosquito coil holders which hold mosquito coils by interaction of a spike or projection provided on an upper part of the holder, with a slot at the centre of a mosquito coil, since such holders cannot effectively hold parts of mosquito coils that do not include the mosquito coil centre. Any suitable structure of jaw may be provided although a preferred structure will be described in due course.

It will therefore be appreciated that the embodiment of FIGS. 1 to 8 provides a mosquito coil holder 1 which is compact, robust, and economical to manufacture. The compact nature of the mosquito coil holder 1 is due in large part to the fact that the receiving space 5 extends substantially the entire length of the mosquito coil holder. The robust nature of the mosquito coil holder is due at least in part to the fact that it can be formed from a material such as sheet steel. The economy of production of the mosquito coil holder 1 is due, at least in part, to the fact that it can be formed from a single strip of sheet metal, and that compared to mosquito coil holders which contain and surround the entire mosquito coil, a relatively small amount of material is required. Furthermore, the mosquito coil holder 1 is simple and convenient to use and can effectively hold either entire mosquito coils or parts of mosquito coils which have become detached from the central part.

Of course it will be appreciated that many alternative structures could be used. For example, a mosquito coil holder need not be formed from a single strip of material, and a functionally similar variation of a mosquito coil holder 1 could be provided by omitting the return parts 53,54 and attaching the central portion 57 directly to axially central regions of the support arms, for example by welding. It will be appreciated that this would involve a more complex manufacturing process than forming a holder from single strip of material and such a structure and manufacture method is not currently preferred.

A further alternative is to form first and second support portions and a connection portion from a suitable resilient plastic (for example by injection moulding) and to provide heat resistant first and second jaws subsequently.

An alternative embodiment of the mosquito coil holder 101 in accordance with the present invention is illustrated in FIGS. 9 to 12, which provide schematic side views of such an embodiment. Consideration of these drawings in combination with the disclosure provided above in relation to FIGS. 1 to 8 should adequately reveal many points of similarity to the skilled addressee and therefore only certain differences between the mosquito coil holder 101 and the mosquito coil holder 1 will be described. Reference numerals corresponding to those used in relation to the mosquito coil holder 1, but prefixed by the digit "1" will be used to designate corresponding parts of the mosquito coil holder 101.

Figure 12:
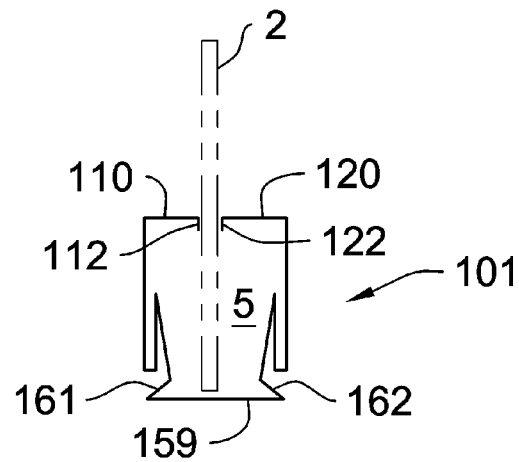
FIG. 12 is a schematic side view of the mosquito coil holder of FIGS. 9 to 11 holding a mosquito coil in a substantially vertical orientation.

The mosquito coil holder 101 has a connecting part 150 which extends further away from jaws 110, 120 than do support arms 130, 140, and connecting part 150 thus extends therefore beyond the transitional parts 151,152. The connecting part 150, rather than being curved like the connection part 50, provides a flat base portion 159, upon which the mosquito coil holder 101 can stand in order to hold a mosquito coil 2 in a generally vertical orientation, as illustrated in FIG. 12. Where the connecting part extends beyond the transitional parts 151,152 it comprises first and second outwardly projecting parts 161,162 so that the base portion 159 is substantially the same width as the mosquito coil holder 101 as a whole, providing good stability. Like the mosquito coil holder 1, in the mosquito coil holder 101 central part 157 of the connection part 150 is structured to allow second end parts 134,144 of support arms 130,140 (along with return parts 153,154) to be operated upon by a user to force them towards each other (as illustrated by the arrows A in FIG. 10) in order to force apart jaws 110, 120 (as illustrated by the arrows B in FIG. 10).

The mosquito coil holder 101, like the mosquito coil holder 1 is formed from a flat strip of metal by folding thereof, but unlike the mosquito coil holder 1 is structured so that can be formed by providing a number of discrete folds, with the lengths between the fold being substantially straight (rather than including any curved parts of the strip) which facilitates manufacture.

Figure 11:
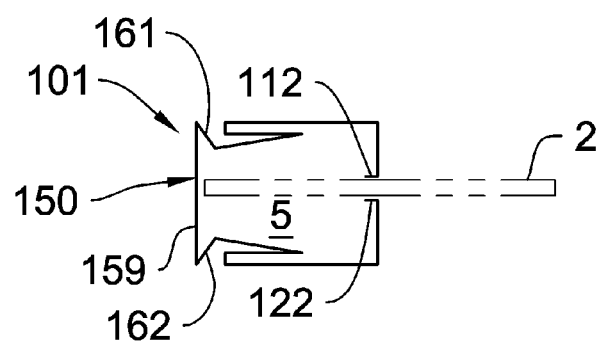
FIG. 11 is a schematic side view of the mosquito coil holder of FIGS. 9 and 10 holding a mosquito coil in a substantially horizontal orientation.

Like the mosquito coil holder 1, the mosquito coil holder 101 thus comprises a clip which provides base parts allowing the mosquito coil holder 101 to stand, and support a mosquito coil, in either a horizontal orientation (as illustrated in FIG. 11) or a vertical orientation (as illustrated in FIG. 12).

It will be appreciated that in the mosquito coil holder 1 the jaws 10, 20 terminated in jaw edges adapted to contact the mosquito coil being held. The configuration of the lower and upper jaw edges, in a preferred embodiment, are illustrated in FIGS. 13a and 13b.

Figure 13A:
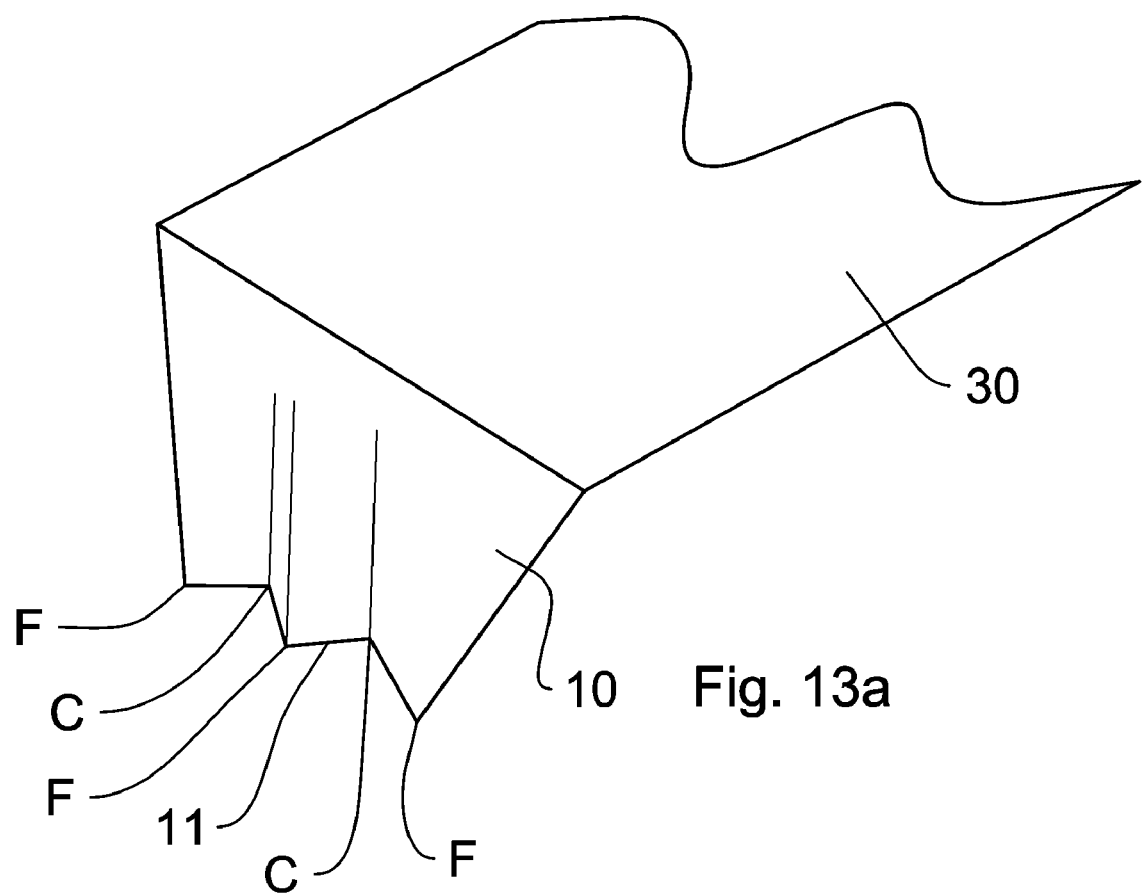
FIG. 13a is a schematic perspective view of an upper jaw or contact portion of a mosquito coil holder in accordance with a preferred embodiment of the invention.

FIG. 13a illustrates an upper jaw 10 which has a jaw edge 11. The jaw 10 projects substantially perpendicularly from the first support arm 30, and is substantially flat or planar adjacent its connection to the first support arm 30. However, the jaw edge 11 is formed into a somewhat zig-zag configuration, so that it has a plurality of parts, designated C in FIG. 13a, which are set back, that is, which are closer to the connection part (50, but not shown in FIG. 13a) and a plurality of parts, designated F in FIG. 13a, which are set forward, that is, which are further from the connection part (50, but not shown in FIG. 13a).

Figure 13B:
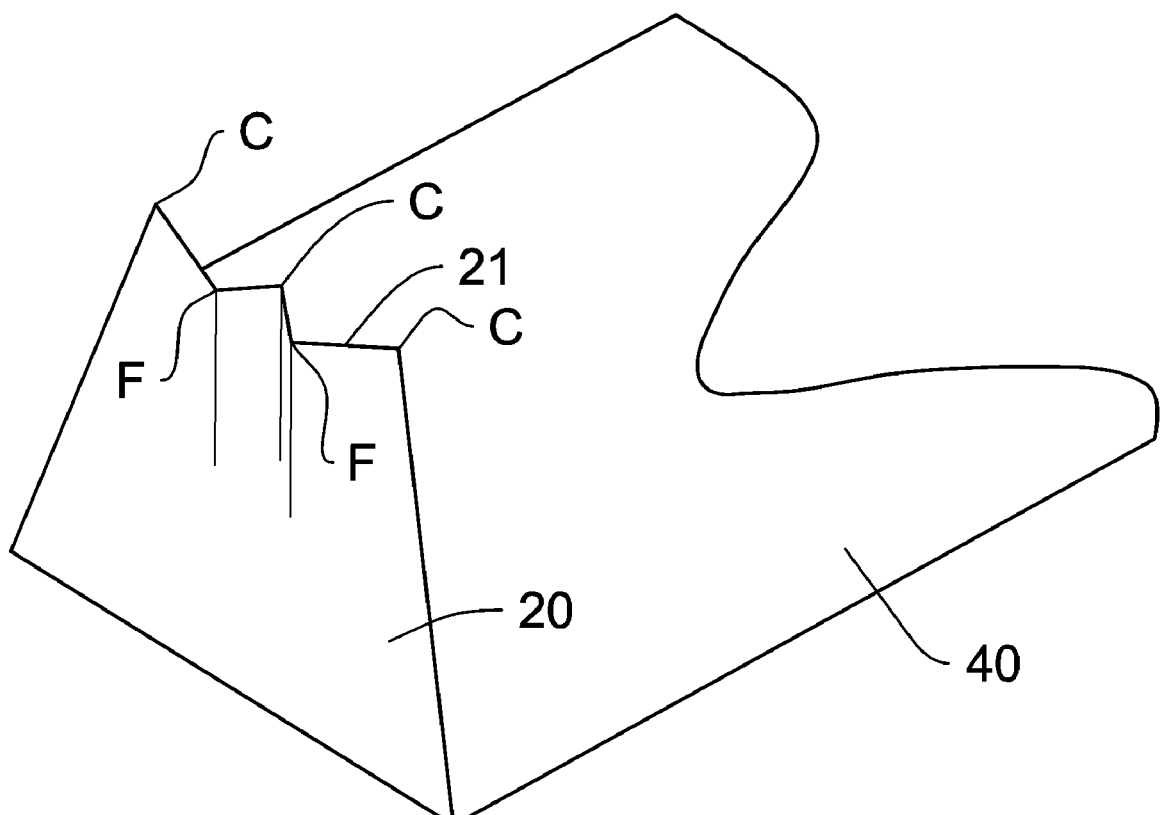
FIG. 13b is a schematic perspective view of a lower jaw or contact portion of a mosquito coil holder in accordance with a preferred embodiment of the invention.

Similarly, FIG. 13b illustrates a lower jaw 20 which has a jaw edge 21. The jaw 20 projects substantially perpendicularly from the support arm 40, and is substantially flat or planar adjacent its connection to the support arm 40. However, the jaw edge 21 is formed into a somewhat zig-zag configuration, so that it has a plurality of parts, designated C in FIG. 13b, which are set back, that is, which are closer to the connection part (50, but not shown in FIG. 13b) and a plurality of parts, designated F in FIG. 13b, which are set forward, that is, which are further from the connection part (50, but not shown in FIG. 13b).

The shaping of the jaw edges 11,21 (and of the regions of the jaws 10,20 adjacent the jaw edges) can be achieved by a pressing process, and can conveniently, economically and quickly be achieved using a crimping device which has suitably shaped jaws. It will be appreciated that the jaws narrow between the support arms 30,40 and the jaw edges 11,21, so the jaw edges are narrow compared to the width of the mosquito coil holder, and are suitable for gripping a turning of a mosquito coil (with a typical width of about 1 cm).

Figure 13C:
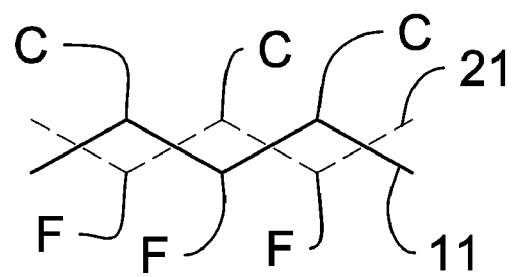
FIG. 13c is a schematic illustration of the overlapping contact edges of the two contact portions or jaws of a mosquito coil holder in accordance with a preferred embodiment of the invention.

FIG. 13c illustrates schematically the overlap of the upper and lower jaw edges 11,21, and it will be appreciated that the described and illustrated shape of the upper and lower jaw edges 11,21 ensure that an object held between the jaws 10,20 will be contacted by the overlapping jaw edges, providing a secure grip and (assuming a suitable force applied by the jaws) will be amply resistant to torsional forces which might be applied by the weight of the mosquito coil, about the region gripped between the jaws.

Alternative shapes of the parts of the jaws which, in use, contact the mosquito coil are of course possible, and one alternative jaw shape, in which the parts of the jaws which, in use, contact the mosquito coil are provided by a perpendicularly projecting part 112,122 of each respective jaw 110,120 is illustrated in FIGS. 9 to 12.

Figure 14:
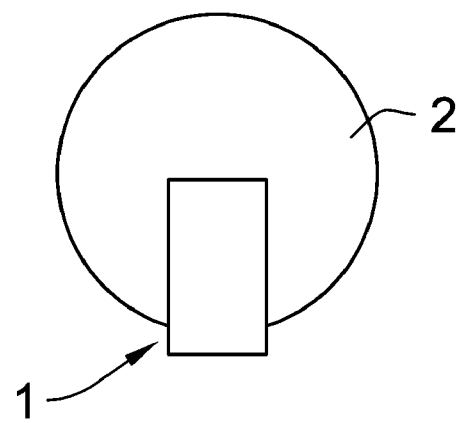
FIG. 14 is a schematic plan view of a mosquito coil holder in accordance with the present invention holding a mosquito coil.

FIG. 14 is a schematic plan view from above of a mosquito coil 2 held in a mosquito coil holder 1.

Figure 15:
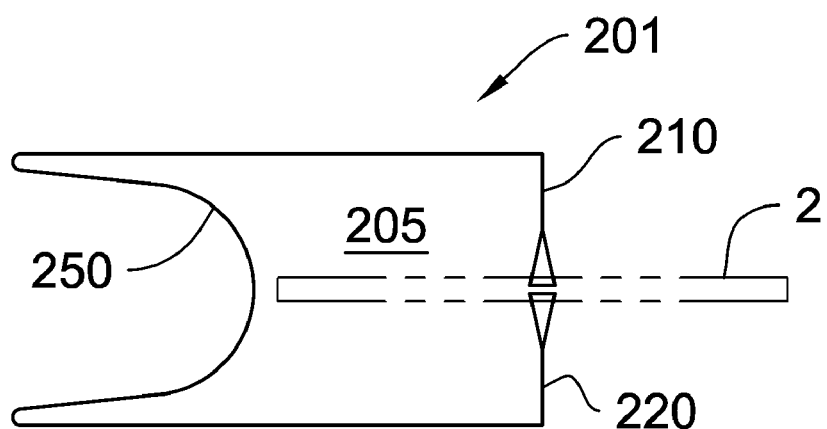
FIG. 15 is a schematic side view of an alternative embodiment of a mosquito coil holder in accordance with an embodiment of the invention.

FIG. 15 is a schematic side view of a mosquito coil 2 held in an alternative embodiment of a mosquito coil holder 201, which like the previously described embodiments is in the form of a self-supporting clip, but which differs from the previously described embodiments in that a connection part 250 projects towards jaws 210, 220, so that a receiving space 205 provided for accommodating part of a mosquito coil does not extend substantially the entire length of the mosquito coil holder 201. Thus the mosquito coil holder 201 would require a length considerably in excess of the radius of the mosquito coil 2, and such an embodiment is not currently preferred.

Figure 16:
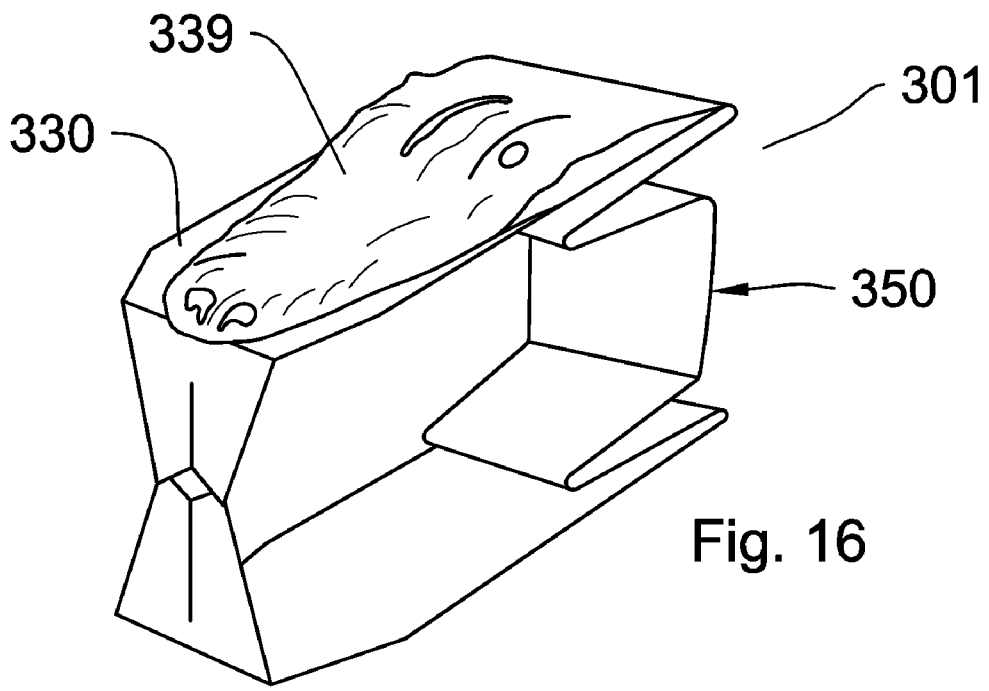
FIG. 16 is a perspective view of a further alternative embodiment.

FIG. 16 is a schematic perspective view of a further alternative embodiment of a mosquito coil holder 301, in which, to enhance its appearance, an upper support arm 330 is provided with decoration 339 which, as illustrated, is a representation of a crocodile head, being an appropriate reference to the jaw-like gripping action of the of the mosquito coil holder. A connection part 350 of the mosquito coil holder 301 combines certain features of earlier described embodiments, in that (similarly to the connection part 50 of the mosquito coil holder 1) it does not extend longitudinally beyond the support arms 330 and does not provide a base upon which the mosquito coil holder 301 can stand, but (similarly to the mosquito coil holder 101) the mosquito coil holder 301 can be formed by making a number of discrete folds in a metal strip, and without curved sections between the folds.

With reference to FIGS. 17 to 21 a further alternative embodiment of a mosquito coil holder in accordance with the present invention is generally designated 401. This embodiment 401, unlike previously described embodiments, is formed by bending a length of thick metal wire (or thin metal bar) with substantially circular cross section, into the desired, illustrated shape. However, this embodiment does have many similarities to previously described embodiments.

This embodiment 401, comprises a first contact portion which in this embodiment is in the form of a first jaw 410 and a second contact portion which in this embodiment is in the form of a second jaw 420. The first and second jaws 410,420 have respective contact ends 412,422 adapted to grip and retain a mosquito coil therebetween.

Figure 17:
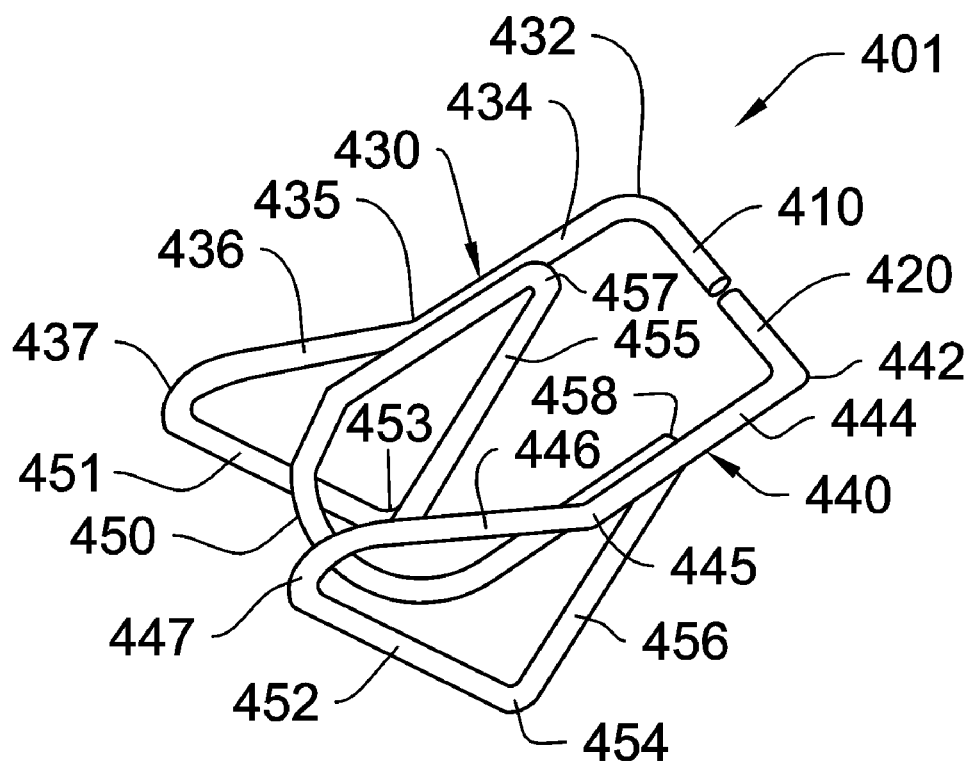
FIG. 17 is a perspective view of a further alternative embodiment formed from a single length of metal bar of circular cross section.

The first jaw 410 is supported by a first support portion in the form of a support arm 430 and the second jaw 20 is supported by a second support arm 440. The first and second support arms 430,440 are generally mutually parallel and extend away from the respective first and second jaws 410, 420 which are provided by right angle bends 432,442 at first ends of the first and second support arms 430,440. The first and second support arms each comprise a first end portion 434,444 which extends in substantially the length direction of the receiving space of the clip 401 from the right angle bends 432,442 at first ends of the first and second support arms 430,440 to respective obtuse bends 435,445 at respective central regions of the support arms 430,440. The first and second support arms each further comprise respective second end portions 436,446, as best illustrated in FIGS. 17 and 20, which extend in the length direction of the receiving space of the clip 401, but also extends from the obtuse bends 435,445 towards a nominal "front" of the clip 401. The arm portions terminate at respective first acute bends 437,447.

Respective base parts 451,452 of the wire or bar extend from the acute bends 437,447 directly towards the nominal rear of the clip. The respective base parts 451, 452 terminate at respective second acute bends 453,454 at to become return parts 455,456 directed towards generally central regions of the first end portions 434,444 of the support arms 430, 440. The return parts are directed slightly inwardly (towards the axial centre of the receiving space) so that the end, at respective third acute bends 457, 458 adjacent the respective central regions of the first end portions 434,444 and so that the third acute bends 457, 458 are between the support arms.

The third acute bends 457, 458 are connected by a connection part 450 of the wire, which is generally U-shaped with the bottom of the U-shape substantially between the base parts 451, 452. Thus the clip 401 is formed from a single length of metal wire. Stainless steel is a suitable metal for this embodiment. The base portions, return portions and connection part may be regarded as together forming a connection portion which connects the support portions.

As illustrated in FIG. 20, forcing the base parts 451, 452 together, which may be achieved using a pinching action of finger and thumb, spreads jaws so that a mosquito coil (or, if desired, some other object to be gripped) can be placed therebetween. More specifically, in this embodiment, when the base parts are forced together parts of the support arms 420, 430 close to the obtuse bends 435,445 abut the limbs of U-shaped connection part, to provide abutment points 460 or fulcrums, which facilitate the opening of the jaws.

Like previously described embodiments, the clip 401 may function in a number of orientations to support a mosquito coil. That is, it may stand "upright" upon the base parts, or may lie upon either of the support arms and be stabilised by a corresponding base part. Thus in this embodiment the limited width of the wire is overcome by having the wire extend in the front-to-rear direction of the clip and thereby provide a base area adequate to give stability. The clip 401 is also easily suspended, for example by hanging it on a hook or cable.

As in previously described embodiments, the connecting part 450 is configured so that the receiving space extends substantially the entire length of the clip.

Of course, many variations and alternatives are possible, and the clip 401 illustrates just one embodiment of a holder formed from a single length of wire.

It will be appreciated that embodiments of the holder described herein, and variations thereof, may be used for purposes other than holding mosquito coils. Of course, many other alternative embodiments are possible, and modifications and improvements may be incorporated without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be clearly understood that any reference herein to a prior art publication does not constitute an admission that the document forms part of the common general knowledge in the art in Australia or in any other country.

The invention claimed is:

1. A mosquito coil holding clip comprising:
   first and second contact portions each adapted to contact at least a portion of a mosquito coil and to hold said mosquito coil therebetween;
   first and second support portions which support the respective said first and second contact portions relative to each other;
   a connection portion which connects said first and second support portions opposite said first and second contact portions; and
   at least one base portion which acts as a base upon which said clip can stand in use, while holding said mosquito coil;
   wherein at least one of said first and second contact portions comprises at least one first contact part for contacting said mosquito coil and at least one second contact part for contacting said mosquito coil, wherein the or each said first contact part is closer to said connection portion than the or each said second contact part.

2. The mosquito coil holding clip as set forth in claim 1, wherein said at least one base portion comprises at least a part of one of said support portions.

3. The mosquito coil holding clip as set forth in claim 2, wherein said at least one base portion comprises a transitional portion between one of said support portions and said connection portion.

4. The mosquito coil holding clip as set forth in claim 3, wherein the clip is configured to hold said mosquito coil in a substantially horizontal plane when standing upon said base portion.

5. The mosquito coil holding clip as set forth in claim 3, wherein said clip is configured to hold said mosquito coil in a substantially vertical plane when standing upon said transitional portion.

6. The mosquito coil holding clip as set forth in claim 3, wherein said clip defines a receiving space between said first and second support portions.

7. The mosquito coil holding clip as set forth in claim 6, wherein said receiving space extends substantially the entire length of said clip.

8. The mosquito coil holding clip as set forth in claim 6, wherein said receiving space is at least 50 mm in length.

9. The mosquito coil holding clip as set forth in claim 6, wherein the receiving space has a length at least equal to the radius of a mosquito coil.

10. The mosquito coil holding clip as set forth in claim 6, wherein said clip is a single piece of metal.

11. The mosquito coil holding clip as set forth in claim 1, wherein said connection portion further comprising:
- a substantially planar first return part depending from a first transitional part of said first support portion, said first return part extends adjacent and parallel to a second end of said first support portion, and extends approximately half the length of said first support portion;
- a substantially planar second return part depending from a second transitional part of said second support portion, said second return part extends adjacent and parallel to a second end of said second support portion, and extends approximately half the length of said second support portion; and
- a central portion located between said first and second return parts, said central portion having a configuration that contributes to the length of said receiving space.

12. A mosquito coil holder comprising:
a clip comprising:
- first and second contact portions each adapted to contact said mosquito coil and to hold said mosquito coil therebetween;
- first and second support portions which support the respective said first and second contact portions relative to each other;
- a connection portion which connects said first and second support portions and allows them to move relative to each other;
- a receiving space for receiving at least part of said mosquito coil therein is defined between said first and second support portions and extends between said first and second contact portions and said connection portion, and wherein said receiving space is configured to accommodate parts of several turnings of said mosquito coil and
- at least one substantially planar return part depending from a transitional portion of one of said first and second support portions, said return part extends adjacent and parallel to a second end of one of said first and second support portions featuring said return part depending therefrom.

13. The mosquito coil holding clip as set forth in claim 12, wherein said receiving space extends at least 70% of the length of said clip to the entire length of said clip.

14. The mosquito coil holding clip as set forth in claim 13, wherein said receiving space has a length of between 50mm and 95mm.

15. The mosquito coil holding clip as set forth in claim 14, wherein said first and second contact portions are configured to grip a centre part of said mosquito coil therebetween, and said connection portion is configured to extend between said first and second support portions beyond an outer periphery of said mosquito coil being held.

16. The mosquito coil holding clip as set forth in claim 14, wherein said clip further comprising at least one base portion which acts as a base upon which said clip can stand in use when holding said mosquito coil.

17. The mosquito coil holding clip as set forth in claim 16, wherein said at least one base portion comprises at least a part of one of said first and second support portions.

18. The mosquito coil holding clip as set forth in claim 17, wherein said at least one base portion comprises said transitional portion between one of said first and second support portions and said connection portion.

19. A mosquito coil holding clip comprising:
- first and second contact portions each adapted to contact said mosquito coil and to hold said mosquito coil therebetween;
- first and second support portions which support the respective said first and second contact portions relative to each other;
- a substantially planar first return part depending from a first transitional part of said first support portion, said first return part extends adjacent and parallel to a second end of said first support portion;
- a substantially planar second return part depending from a second transitional part of said second support portion, said second return part extends adjacent and parallel to a second end of said second support portion;
- a central portion located between said first and second return parts, said central portion being configured to allow said first and second support portions to move relative to each other;
- a receiving space for receiving at least part of said mosquito coil therein is defined between said first and second support portions and extends between said first and second contact portions and said connection portion, said central portion having a configuration that contributes to the length of said receiving space, and wherein said receiving space is configured to accommodate parts of several turnings of said mosquito coil; and
- at least one base portion which acts as a base upon which said clip can stand in use, while holding said mosquito coil.

* * * * *